United States Patent
Okuda

(10) Patent No.: US 8,135,437 B2
(45) Date of Patent: Mar. 13, 2012

(54) CELLULAR PHONE

(75) Inventor: Kei Okuda, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 809 days.

(21) Appl. No.: 12/294,394

(22) PCT Filed: Mar. 9, 2007

(86) PCT No.: PCT/JP2007/054726
§ 371 (c)(1),
(2), (4) Date: Sep. 24, 2008

(87) PCT Pub. No.: WO2007/111111
PCT Pub. Date: Oct. 4, 2007

(65) Prior Publication Data
US 2009/0258675 A1  Oct. 15, 2009

(30) Foreign Application Priority Data

Mar. 29, 2006 (JP) .................................. 2006-089705

(51) Int. Cl.
H04M 1/00 (2006.01)
(52) U.S. Cl. ................... 455/556.1; 455/566; 455/575.3
(58) Field of Classification Search ............... 455/556.1, 455/575.3, 575.4, 566; 348/552
See application file for complete search history.

(56) References Cited

U.S. PATENT DOCUMENTS

| | | | |
|---|---|---|---|
| 7,372,452 B2 * | 5/2008 | Park | 345/158 |
| 7,522,947 B2 * | 4/2009 | Tsuda | 455/575.3 |
| 2001/0004269 A1 * | 6/2001 | Shibata et al. | 348/333.06 |
| 2002/0198006 A1 | 12/2002 | Hirayama et al. | |
| 2003/0013417 A1 * | 1/2003 | Bum | 455/90 |
| 2003/0064758 A1 * | 4/2003 | Mizuta et al. | 455/566 |
| 2003/0203747 A1 | 10/2003 | Nagamine | |
| 2004/0056985 A1 * | 3/2004 | Seong | 348/838 |

(Continued)

FOREIGN PATENT DOCUMENTS

| | | |
|---|---|---|
| JP | 2001-24760 A | 1/2001 |
| JP | 2003-8695 A | 1/2003 |
| JP | 2003-319043 A | 11/2003 |
| JP | 2004-134999 A | 4/2004 |
| JP | 2004-215180 A | 7/2004 |

(Continued)

OTHER PUBLICATIONS

SGH-x495 Series Telephone, User Guide, 2005, Samsung Telecommunications America, Inc.*

Primary Examiner — Temesgh Ghebretinsae
Assistant Examiner — Gennadiy Tsvey
(74) Attorney, Agent, or Firm — Birch, Stewart, Kolasch & Birch, LLP

(57) ABSTRACT

In a cellular phone a rotational position sensing part senses that a display casing has been rotated from a horizontally long state to a vertically long state, and a drive voltage is supplied to a TV broadcast receiving part by a drive voltage supplying part, and an incoming call processing part performs incoming call processing, such that a response part establishes a telephone conversion state in response to the incoming call, and a drive voltage control part stops the supply of the drive voltage by the drive voltage supplying part. When a call is made from an opposite side telephone set while a TV broadcast is watched, the call can be responded to only by rotating the display casing, and the supply of the drive voltage to the TV broadcast receiving part can be automatically stopped, so that power consumption can be efficiently reduced while reducing the burden of operations.

5 Claims, 14 Drawing Sheets

U.S. PATENT DOCUMENTS

| | | | |
|---|---|---|---|
| 2004/0095483 A1* | 5/2004 | Masuno | 348/231.99 |
| 2004/0137940 A1 | 7/2004 | Matsunami | |
| 2005/0070327 A1* | 3/2005 | Watanabe | 455/552.1 |
| 2005/0122311 A1* | 6/2005 | Lee et al. | 345/158 |
| 2005/0212983 A1 | 9/2005 | Kawamoto | |
| 2007/0135181 A1* | 6/2007 | Ohki et al. | 455/575.1 |
| 2009/0011798 A1* | 1/2009 | Yamada | 455/566 |

FOREIGN PATENT DOCUMENTS

| | | | |
|---|---|---|---|
| JP | 2005-12344 A | | 1/2005 |
| JP | 2005-94418 A | | 4/2005 |
| JP | 2005094418 A | * | 4/2005 |
| JP | 2005-221907 A | | 8/2005 |
| JP | 2005-277992 A | | 10/2005 |

* cited by examiner

【Fig. 1】
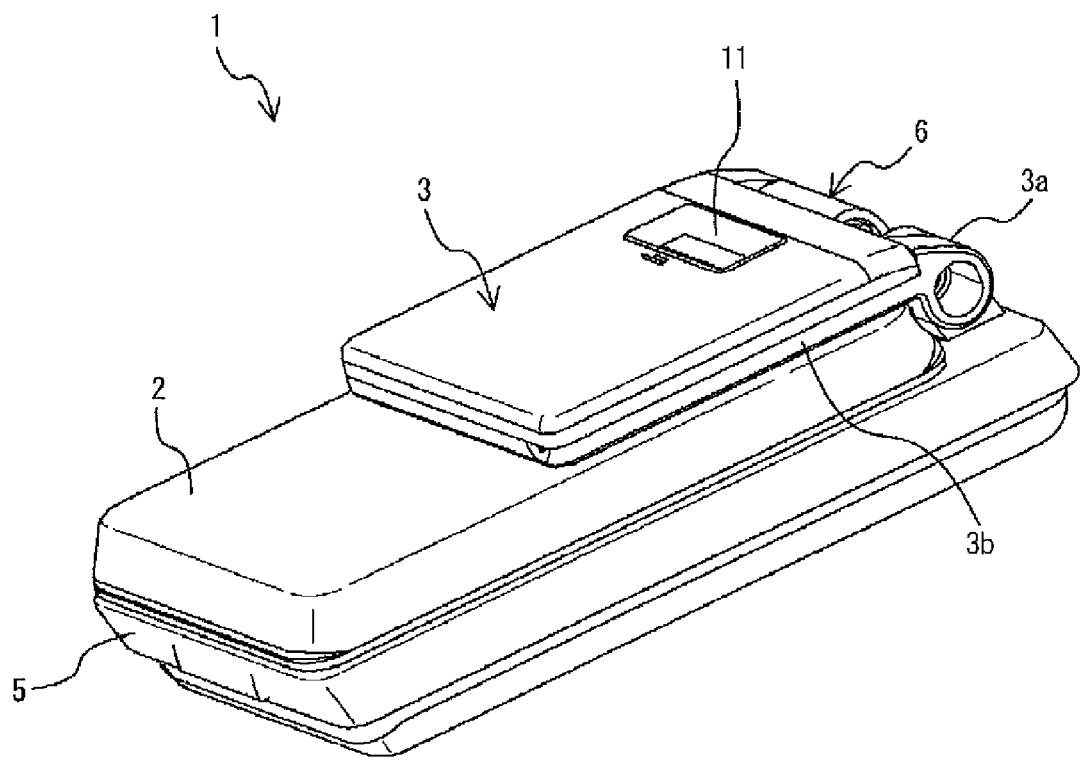

[Fig. 2]
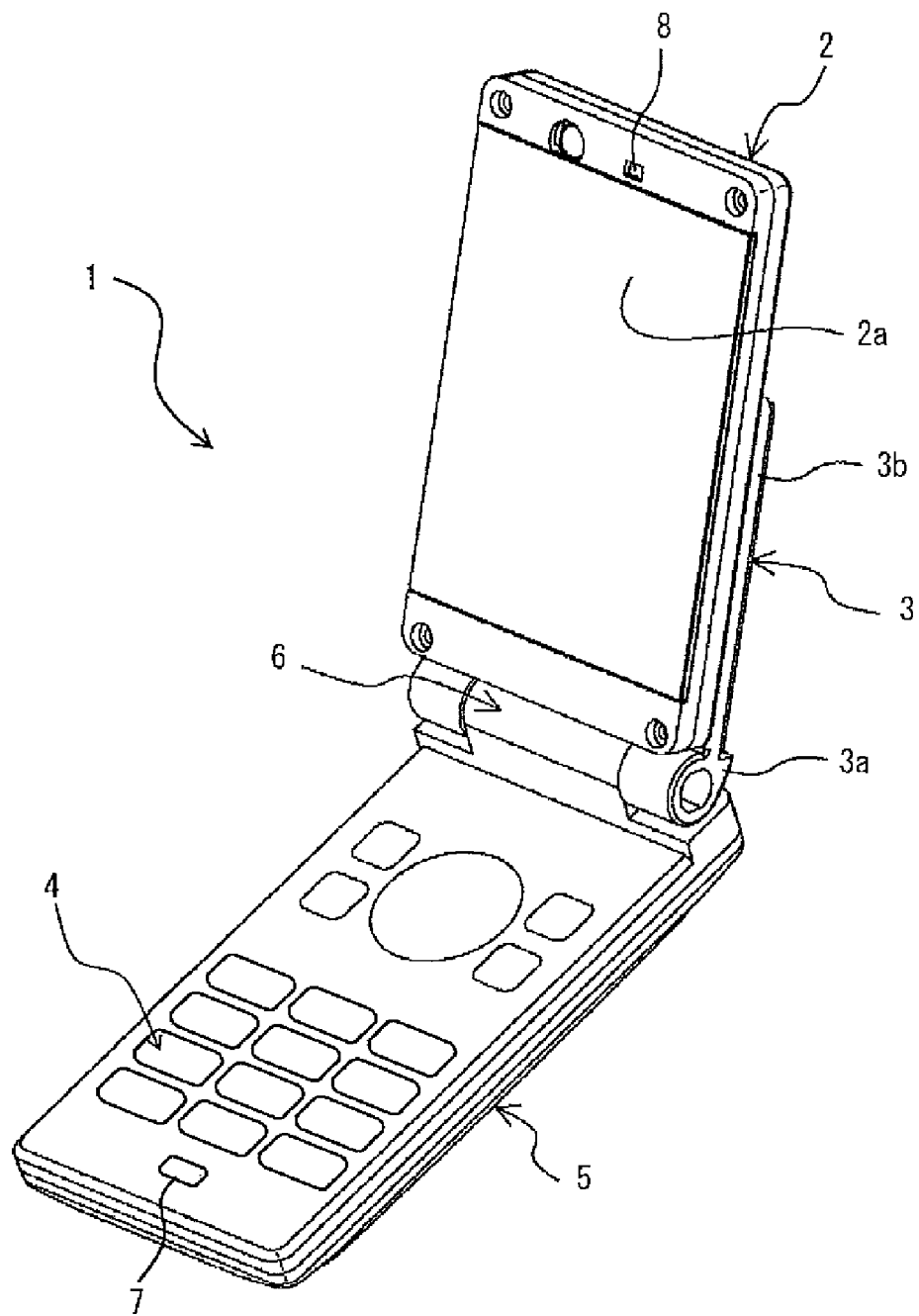

[Fig. 3]
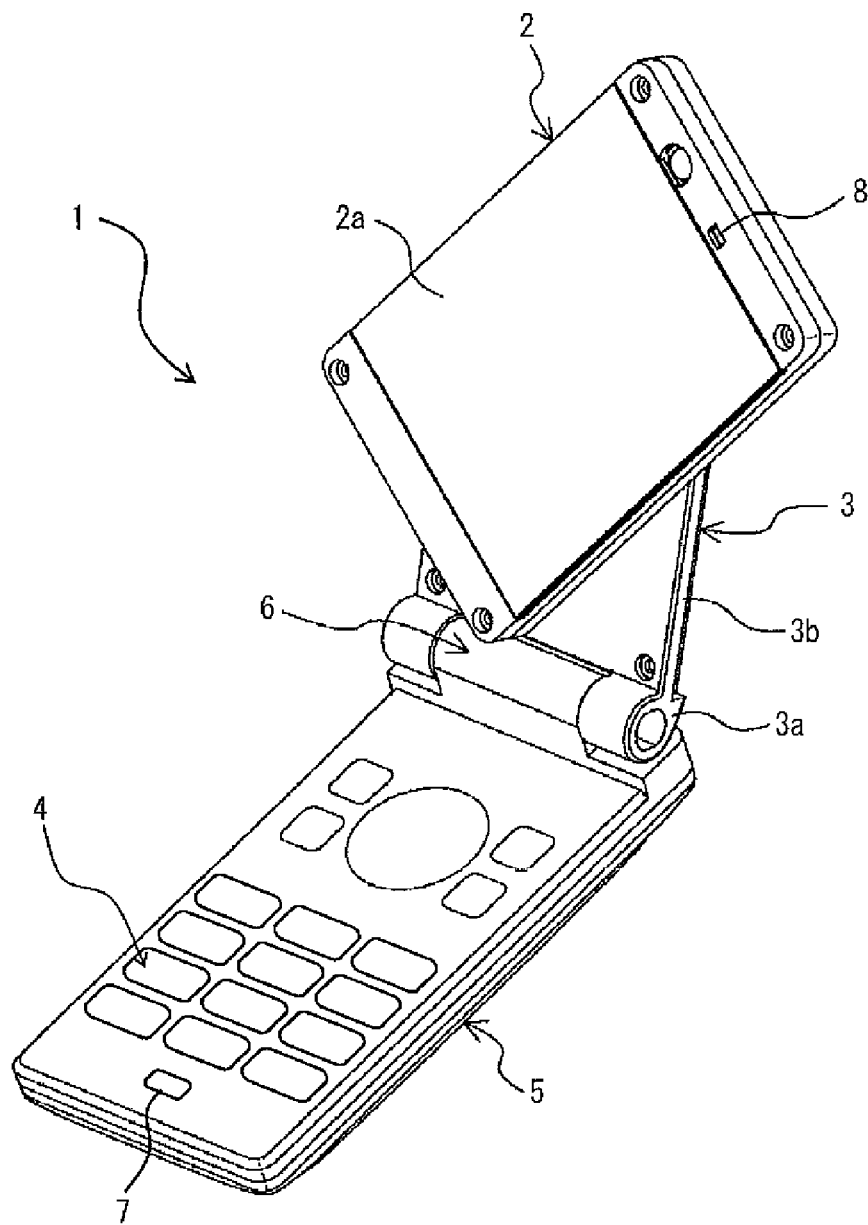

[Fig. 4]
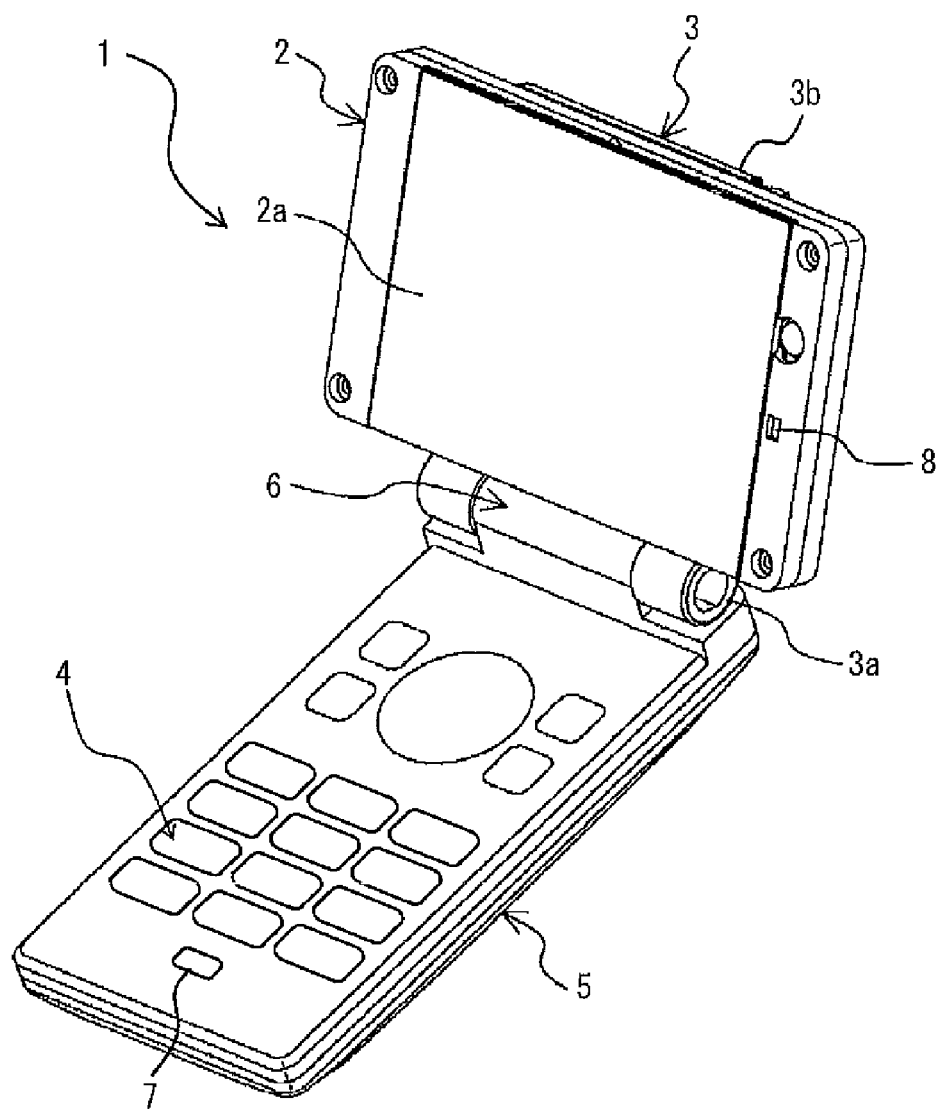

【Fig. 5】
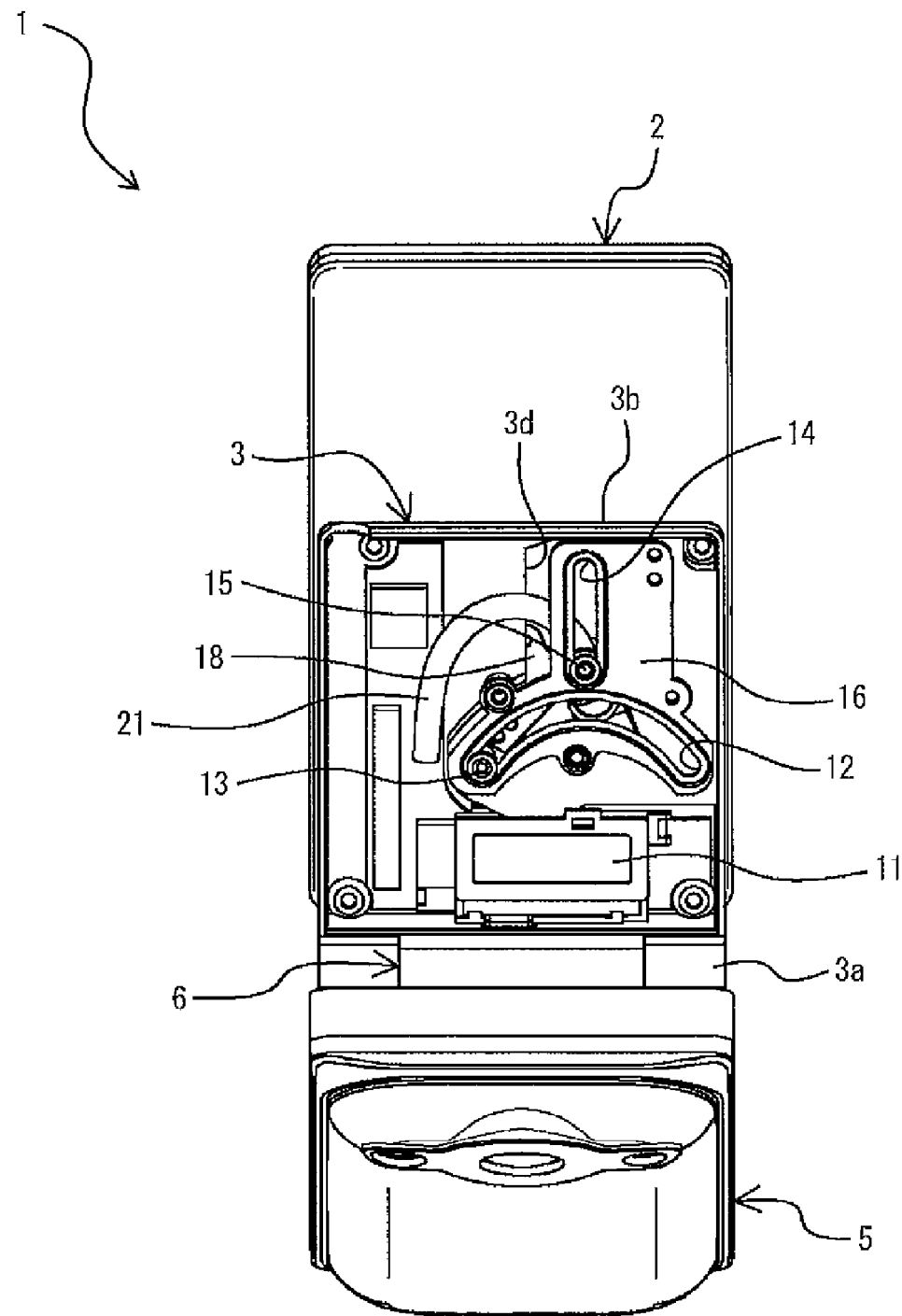

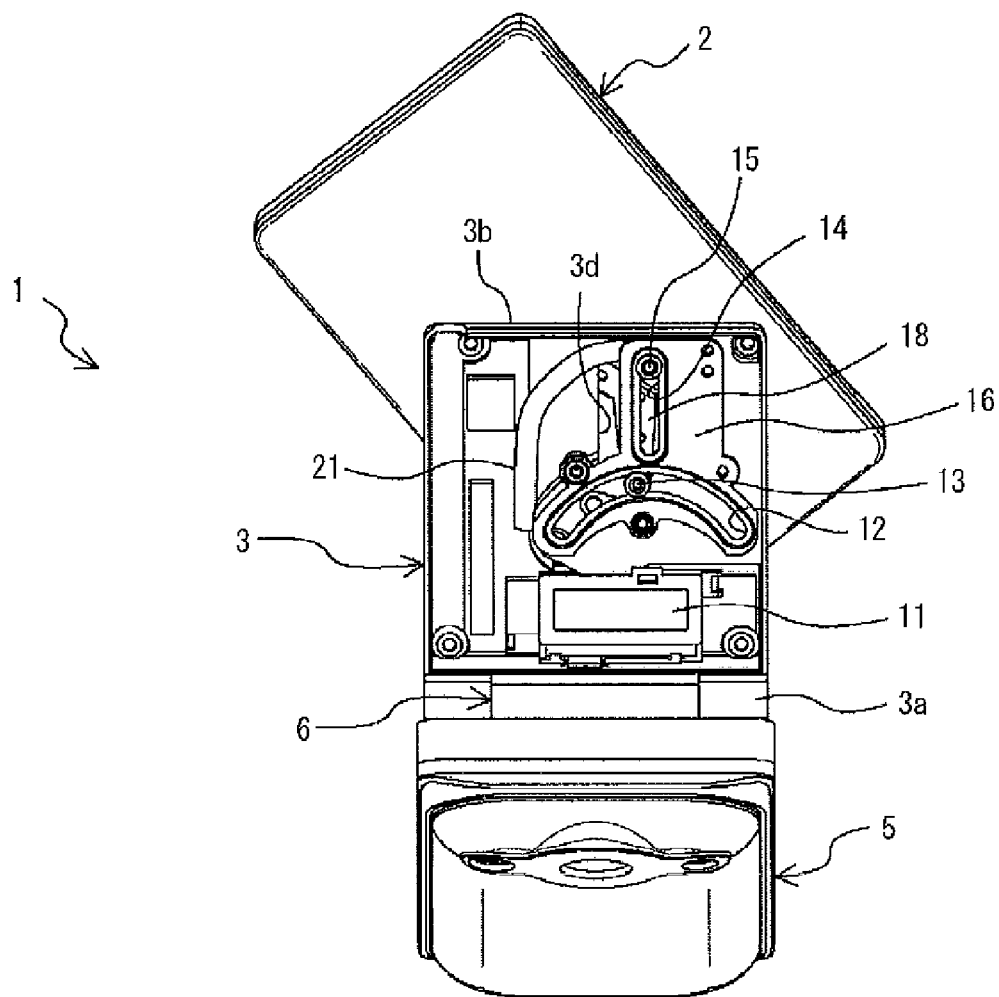
[Fig. 6]

[Fig. 7]
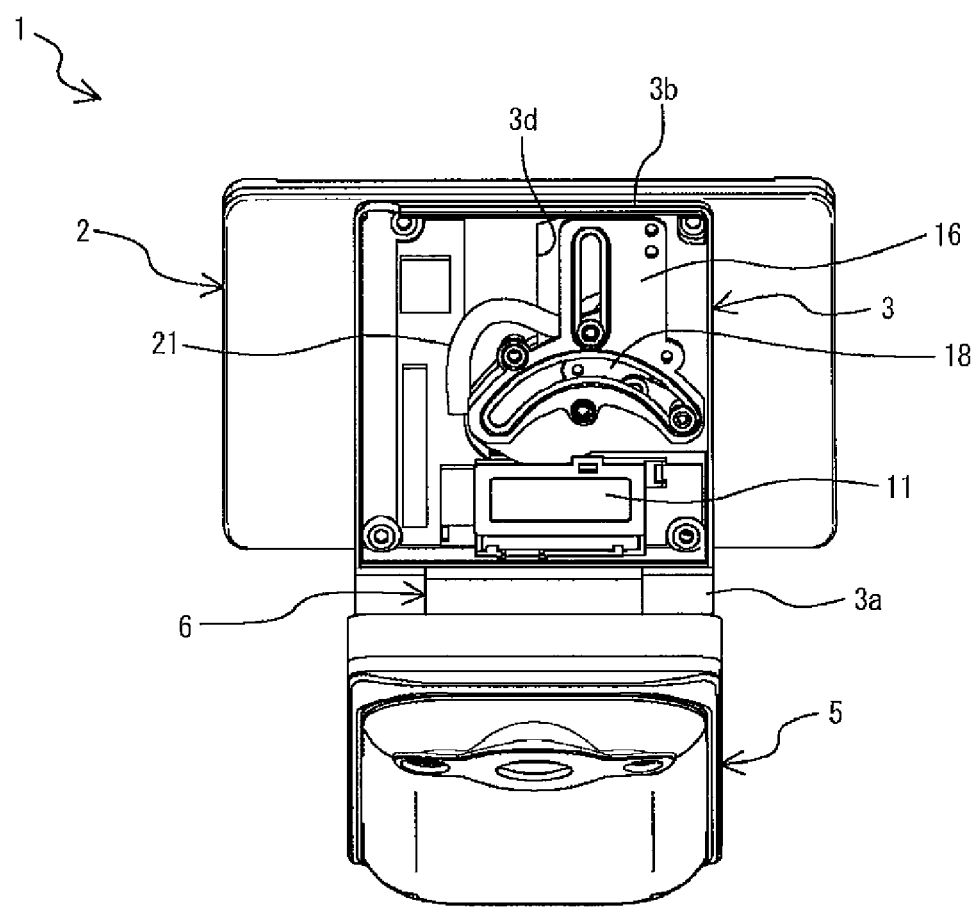

[Fig. 8]
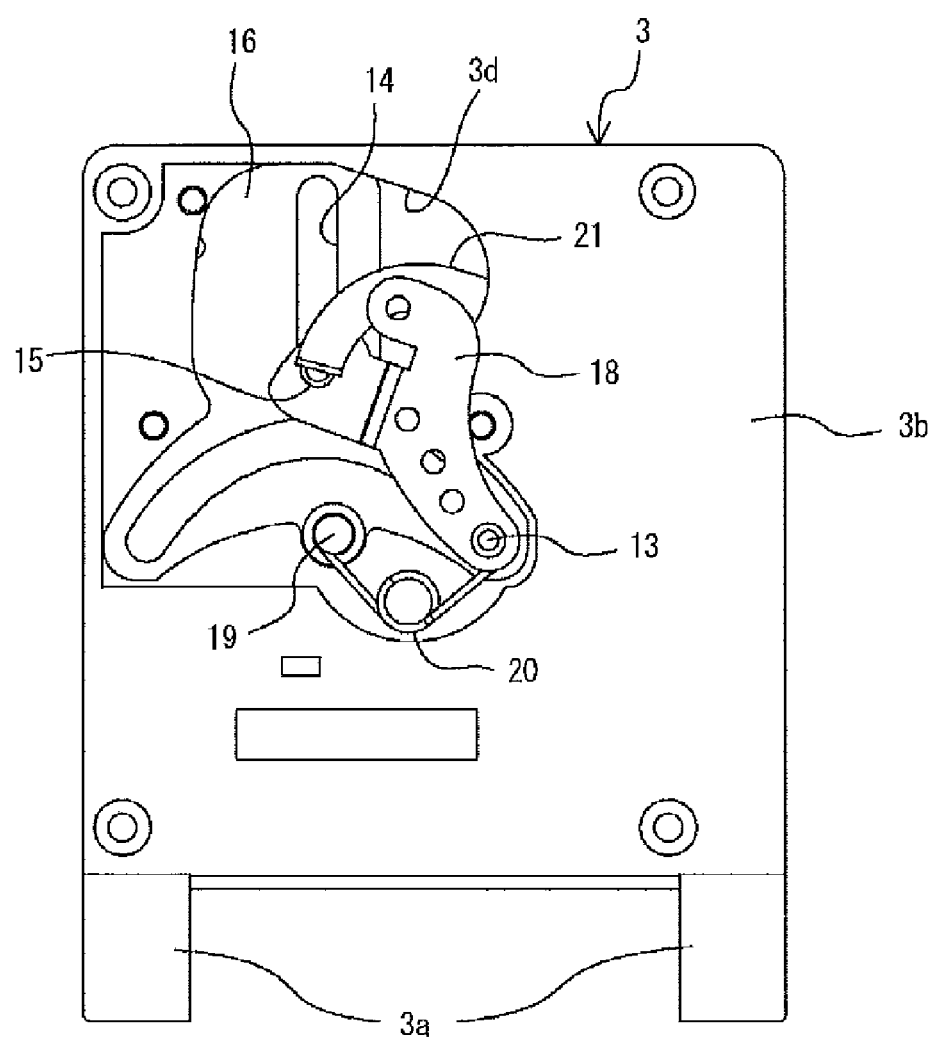

[Fig. 9]
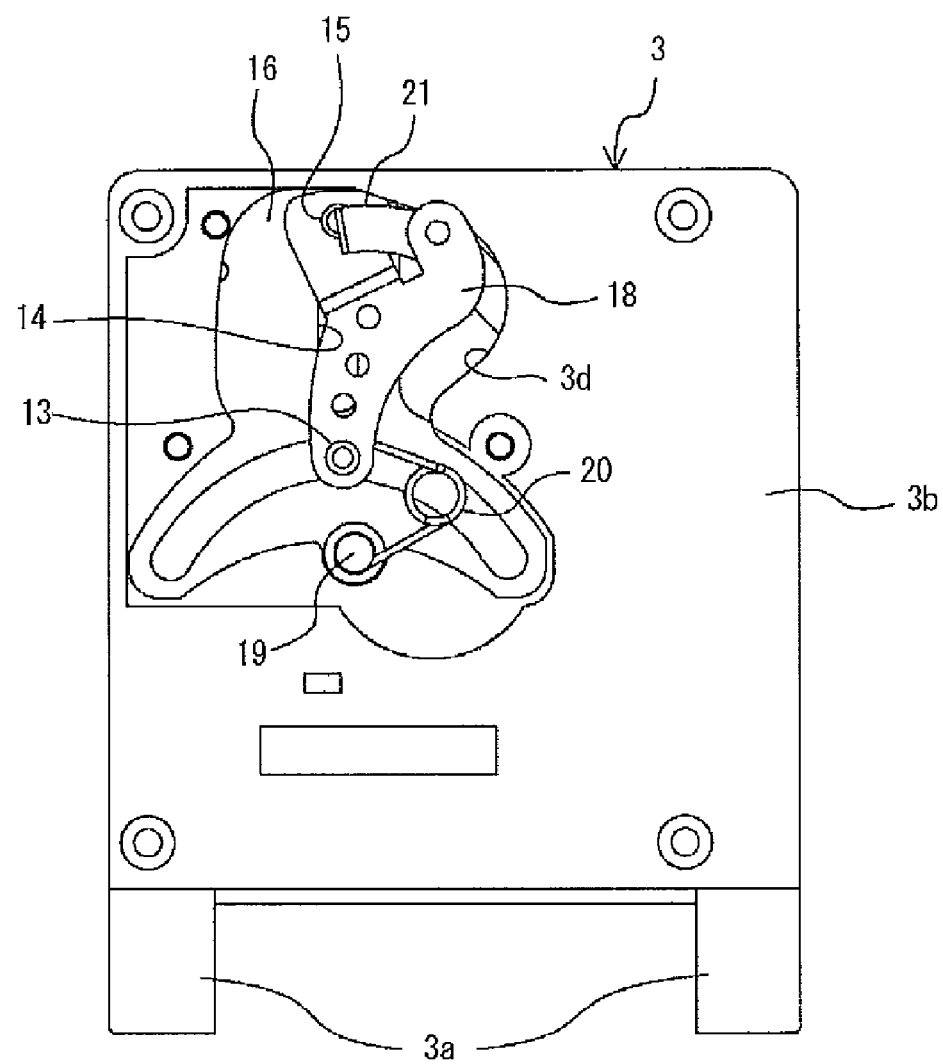

[Fig. 10]
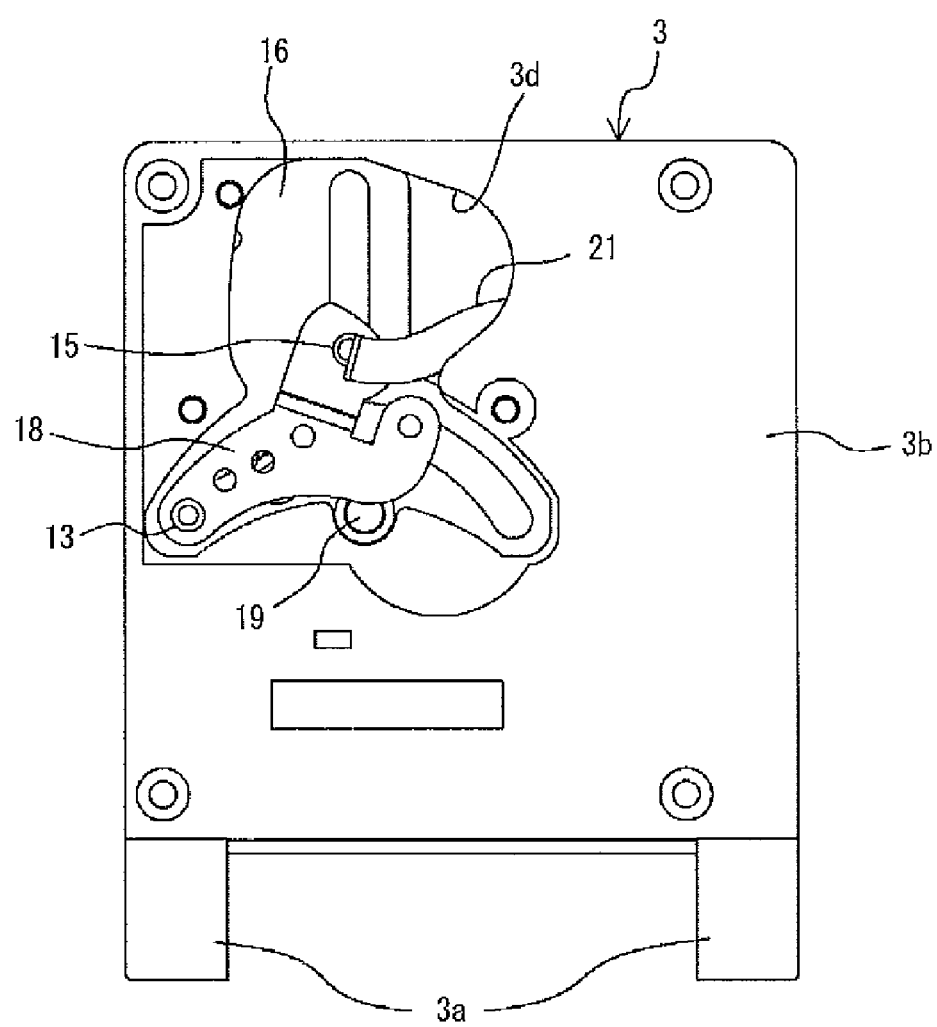

[Fig. 11]
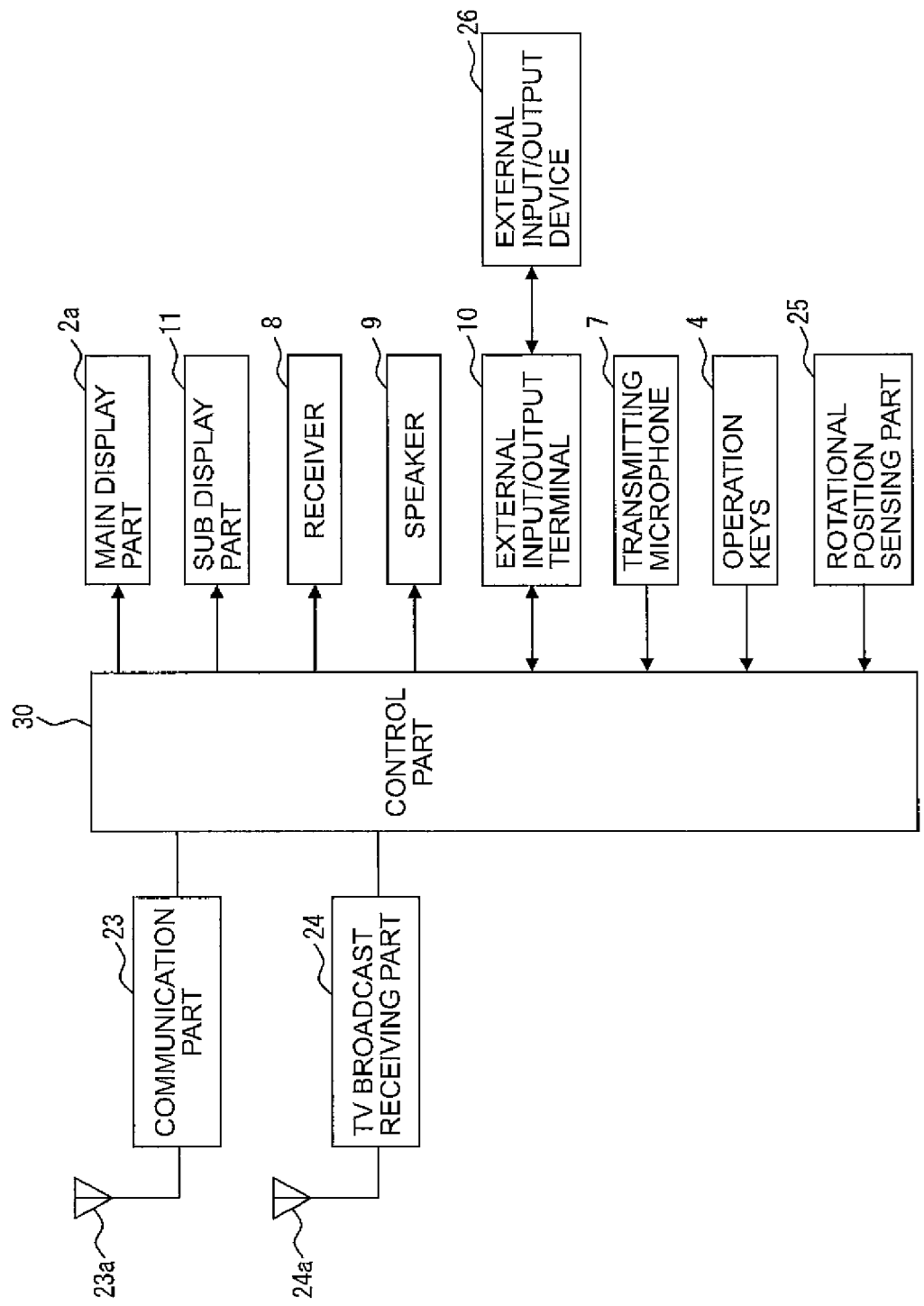

[Fig. 12]
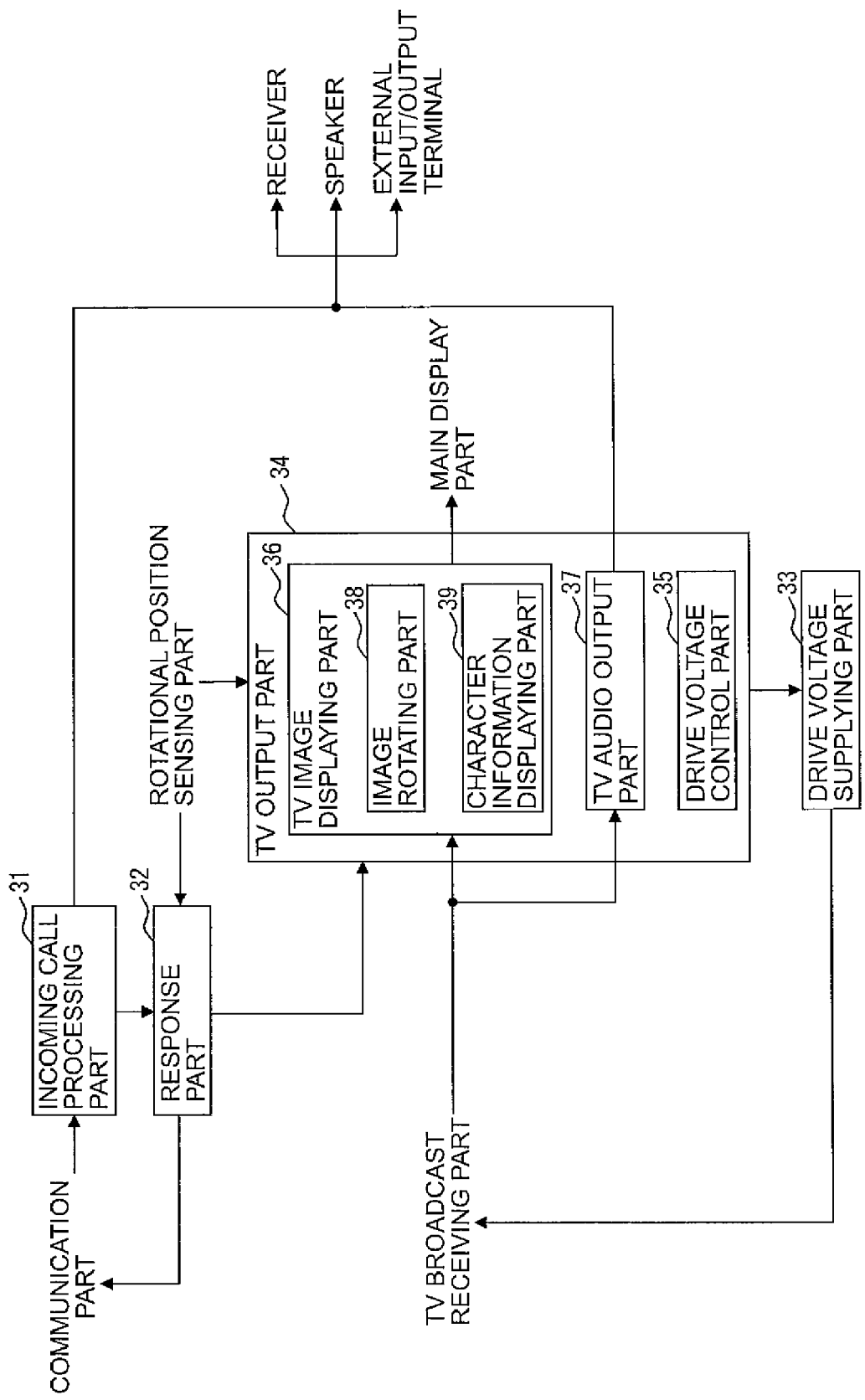

【Fig. 13】
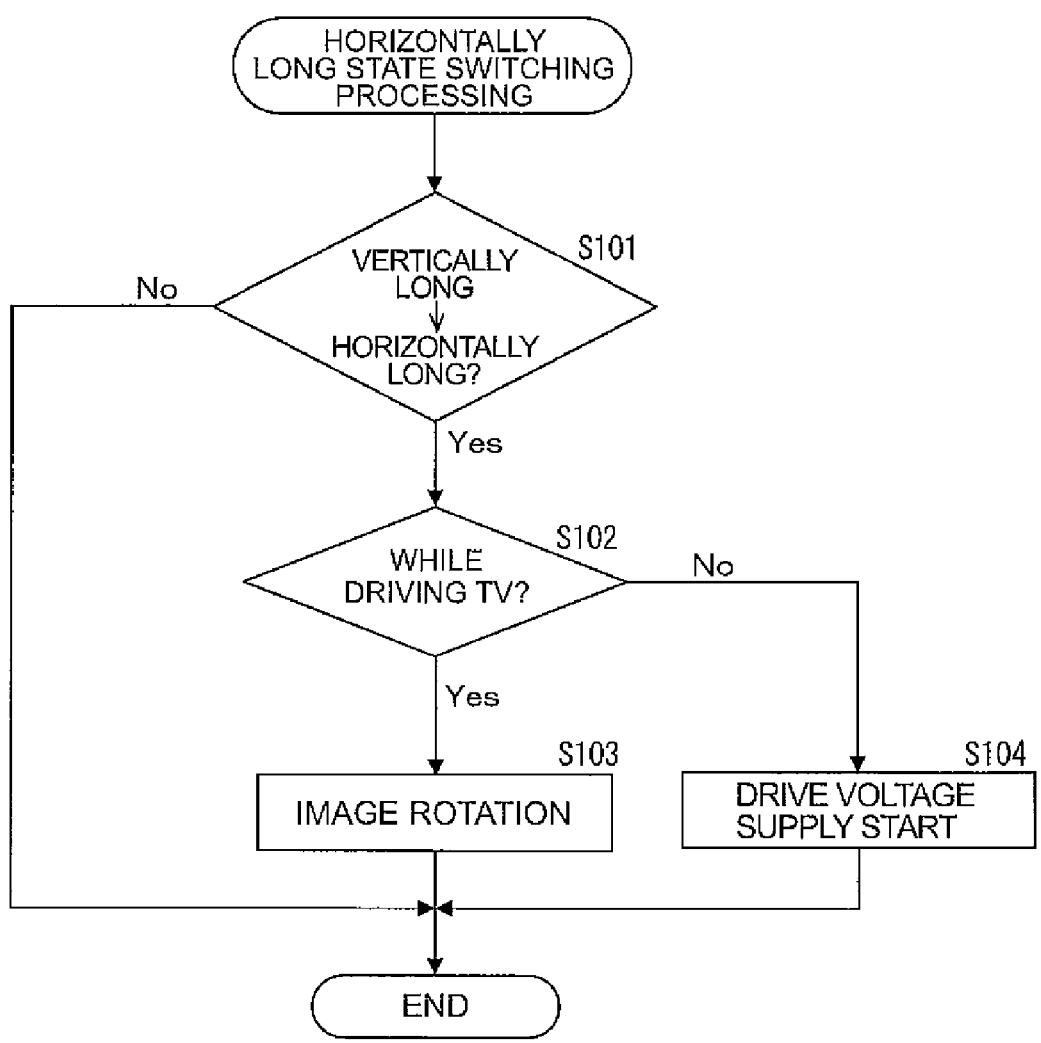

[Fig. 14]
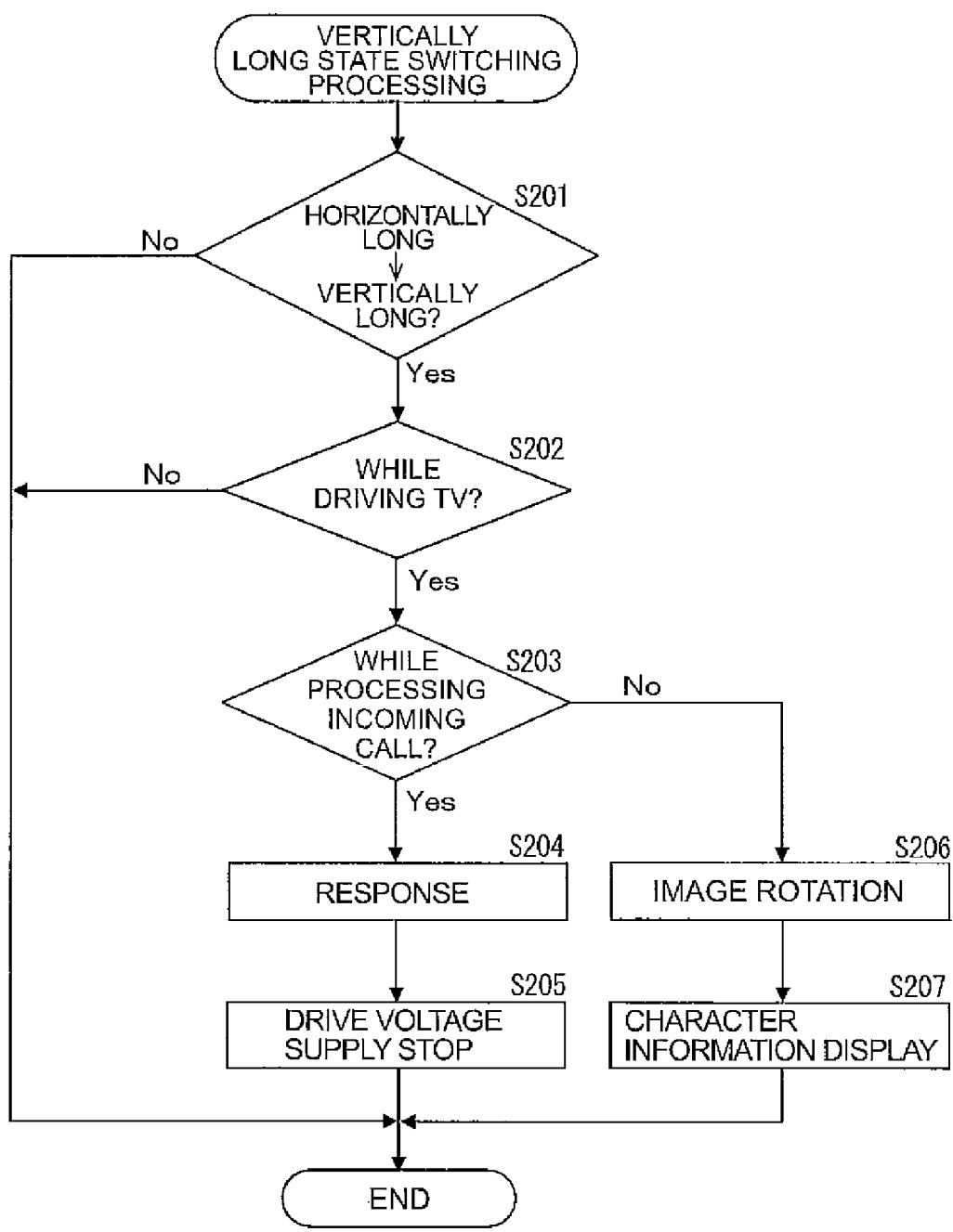

CELLULAR PHONE

TECHNICAL FIELD

The present invention relates to a cellular phone, and more particularly, to improvement of a cellular phone enabling a TV broadcast to be watched.

BACKGROUND ART

There is known a cellular phone including a display casing formed with a display screen, and an operation casing arranged with multiple operation keys, wherein the display casing is rotatably held in a plane parallel to the display screen by the operation casing (for example, Patent documents 1 and 2). This sort of cellular phone is adapted, for example, such that the display screen is formed in a rectangular shape, and by rotating the display casing with respect to the operation casing, switching between a vertically long state in which a longer direction of the display screen is made vertical to provide a display and a horizontally long state in which a shorter direction of the display screen is made vertical to provide a display can be performed to use the phone.

This sort of cellular phone includes one that includes an antenna for receiving a TV broadcast wave transmitted from a TV station, and is adapted such that a TV broadcast can be watched by displaying TV images on the display screen on the basis of the TV broadcast wave and outputting various types of TV voice corresponding to the TV images. The TV images have an aspect ratio typically representing a horizontally long shape, so that by bringing the display screen into the horizontally long state, the TV images can be displayed in an excellent condition.

On the other hand, in a case where telephone conversation is made in response to a call from an opposite side telephone set, the cellular phone is used with the display screen being in the vertically long state. The typical cellular phone includes a transmitting microphone for inputting voice at one end part in a longer direction of the operation casing, and a receiver for outputting voice from the opposite side telephone set at one end part in a longer direction of the display casing. Accordingly, the cellular phone is adapted to enable the telephone conversation in an excellent condition with a mouth being brought close to the transmitting microphone and an ear being brought close to the receiver by bringing the display screen into the vertically long state and bringing a face close to the cellular phone.

Patent Document 1: Japanese Unexamined Patent Publication No. 2004-215180

Patent Document 2: Japanese Unexamined Patent Publication No. 2005-12344

BRIEF DESCRIPTION OF THE DRAWINGS

FIG. 1 is a perspective view illustrating an example of a cellular phone according to an embodiment of the present invention, in which a state where casings are closed is illustrated.

FIG. 2 is a perspective view illustrating a state where the casings of the cellular phone in FIG. 1 are expanded.

FIG. 3 is a perspective view illustrating a state where the display casing of the cellular phone 1 in FIG. 2 is rotated, in which the state where the display casing is rotated clockwise from the state illustrated in FIG. 2 by approximately 45 degrees as viewed from the front.

FIG. 4 is a perspective view illustrating a state where the display casing of the cellular phone 1 in FIG. 2 is rotated, in which the state where the display casing is rotated clockwise from the state illustrated in FIG. 2 by 90 degrees as viewed from the front.

FIG. 5 is a rear view of the cellular phone in the state illustrated in FIG. 2, in which a structure inside a holding part is illustrated as viewed transparently.

FIG. 6 is a rear view of the cellular phone in a state illustrated in FIG. 3, in which the structure inside the holding part is illustrated as viewed transparently.

FIG. 7 is a rear view of the cellular phone in a state illustrated in FIG. 4, in which the structure inside the holding part is illustrated as viewed transparently.

FIG. 8 is a front view of a hinge part in the state illustrated in FIG. 2.

FIG. 9 is a front view of the hinge part in the state illustrated in FIG. 3.

FIG. 10 is a front view of the hinge part in the state illustrated in FIG. 4.

FIG. 11 is a block diagram illustrating an example of an electrical configuration of the cellular phone.

FIG. 12 is a block diagram for explaining operations for a case where a communication part and a TV broadcast receiving part receive signals.

FIG. 13 is a flowchart illustrating an example of horizontally long state switching processing performed when a state of the display casing is switched from a vertically long state to a horizontally long state.

FIG. 14 is a flowchart illustrating an example of vertically long state switching processing performed when the state of the display casing is switched from the horizontally long state to the vertically long state.

DISCLOSURE OF THE INVENTION

Problems to be Solved by the Invention

As described, a direction of the display screen enabling the telephone conversation to be made in an excellent condition and that of the display screen enabling the TV broadcast to be watched in an excellent condition are generally different from each other. Accordingly, if a call from the opposite side telephone set is made while the TV broadcast is watched in the horizontally long state, operations for rotating the display casing to bring it into the vertically long state and responding to the call should be performed, whereas, to watch the TV broadcast, operations for rotating the display casing from the vertically long state to bring it into the horizontally long state and starting watching the TV broadcast should be performed, and in either case, the operations are burdensome.

Also, power consumption by the cellular phone to watch the TV broadcast is relatively high, and therefore the display of the TV images, or the like is preferably stopped except when necessary, as in the case where the telephone conversation with the opposite side telephone set is made.

The present invention is made in consideration of the above situation, and an object thereof is to provide a cellular phone capable of efficiently reducing power consumption. Another object of the present invention is to provide a cellular phone in which the burden of operations is reduced.

Means Adapted to Solve the Problem

A cellular phone according to a first aspect of the present invention is configured to include: a display casing formed with a rectangular display screen on a casing surface; voice outputting means arranged inside the display casing on one end side in a longer direction of the display screen, the voice outputting means being used with a user placing his/her ear against the casing surface; holding means adapted to rotatably hold the display casing in a plane parallel to the display screen such that the display screen is brought into a vertically long state or a horizontally long state; rotating operation detecting means adapted to detect a rotating operation of the display casing by the user; television broadcast receiving means adapted to receive a television broadcast wave; drive voltage supplying means adapted to supply a drive voltage to the television broadcast receiving means; television image displaying means adapted to display a television image on the display screen, the television image being generated on a basis of the received television broadcast wave and rotated according to the rotating operation; and drive voltage supply stopping means adapted to stop a supply of the drive voltage by the drive voltage supplying means on a basis of the rotating operation for making the display screen displaying the television image undergo a transition from the horizontally long state to the vertically long state.

Based on such configuration, only by rotating the display casing from the horizontally long state to the vertically long state with the display casing being in the horizontally long state and the television image being displayed on the display screen, the supply of the drive voltage to the television broadcast receiving means can be stopped. Accordingly, in the case, or the like, where a call from an opposite side telephone set is made while a television broadcast is watched, and the call is responded to, the supply of the drive voltage to the television broadcast receiving means can be automatically stopped only by rotating the display casing to the vertically long state appropriate to a telephone conversation, and therefore power consumption can be efficiently reduced while reducing the burden of operations.

A cellular phone according to a second aspect of the present invention is configured to include: wireless communication means adapted to transmit/receive a call signal and a response signal; and incoming call responding means adapted to, on the basis of the rotating operation for making the display screen displaying the television image undergo the transition from the horizontally long state to the vertically long state, generate the response signal to establish a telephone conversion state during a time period during which the call signal can be responded to, wherein the drive voltage supply stopping means stops, on the basis of the rotating operation for making the display screen displaying the television image undergo the transition from the horizontally long state to the vertically long state, the supply of the drive voltage by the drive voltage supplying means during the time period during which the call signal can be responded to.

Based on such configuration, only by rotating the display casing from the horizontally long state to the vertically long state when the call signal is received with the display casing being in the horizontally long state and the television image being displayed on the display screen, the call can be responded to, and the supply of the drive voltage to the television broadcast receiving means can be stopped. Accordingly, in the case where a call from an opposite side telephone set is made while a television broadcast is watched, the call can be responded to only by rotating the display casing, and the supply of the drive voltage to the television broadcast receiving means can be automatically stopped, so that the burden of operations can be reduced.

A cellular phone according to a third aspect of the present invention is configured such that the television image displaying means has first image rotating means adapted to, on the basis of the rotating operation for making the display screen displaying the television image undergo the transition from the horizontally long state to the vertically long state, rotate the display of the television image by 90 degrees with respect to the display screen during a time period other than the time period during which the call signal can be responded to.

Based on such configuration, if the display casing is rotated from the horizontally long state to the vertically long state with the television image being displayed on the display screen during a time period other than that during which the call signal can be responded to, a direction of the television image can be aligned with a rotational position by rotating the display of the television image by 90 degrees with respect to the display screen.

A cellular phone according to a fourth aspect of the present invention is configured such that the television image displaying means has character information displaying means adapted to extract character information corresponding to the television image from the television broadcast wave to display the character information together with the television image on the display screen having been brought into the vertically long state.

Based on such configuration, the character information such as a caption corresponding to the television image can be displayed on a blank space appearing on the display screen due to a difference between a ratio between vertical and horizontal sizes of the display screen and an aspect ratio of the television image in the state where the display casing has been rotated to the vertically long state. Accordingly, if it is desired to display the character information, the character information can be displayed only by rotating the display casing to the vertically long state, and therefore convenience can be improved.

A cellular phone according to a fifth aspect of the present invention is configured to include drive voltage supply starting means adapted to, on a basis of the rotating operation for making the display screen undergo a transition from the vertically long state to the horizontally long state, start the supply of the drive voltage by the drive voltage supplying means while the drive voltage is not supplied to the television broadcast receiving means.

Based on such configuration, only by rotating the display casing from the vertically long state to the horizontally long state, the supply of the drive voltage to the television broadcast receiving means can be started, and the television image can be automatically displayed on the display screen. Accordingly, to watch a television broadcast, it is not necessary to perform both of the operations for rotating the display casing and starting the supply of the drive voltage to the television broadcast receiving means, and therefore the burden of operations can be reduced.

A cellular phone according to a sixth aspect of the present invention is configured such that the television image displaying means has second image rotating means adapted to, on the basis of the rotating operation for making the display screen displaying the television image undergo the transition from the vertically long state to the horizontally long state, rotate the display of the television image by 90 degrees with respect to the display screen while the drive voltage is supplied to the television broadcast receiving means.

Based on such configuration, if the display casing is rotated from the vertically long state to the horizontally long state with the television image being displayed on the display screen, a direction of the television image can be aligned with a rotational position by rotating the display of the television image by 90 degrees with respect to the display screen.

Effects of the Invention

According to the present invention, only by rotating the display casing from the horizontally long state to the vertically long state with the display casing being in the horizontally long state and the television image being displayed on the display screen, the supply of the drive voltage to the television broadcast receiving means can be stopped. Based on this, in the case, or the like, where the call from the opposite side telephone set is made while the television broadcast is watched, and the call is responded to, power consumption can be efficiently reduced while reducing the burden of operations.

BEST MODE FOR CARRYING OUT THE INVENTION

FIG. 1 is a perspective view illustrating an example of a cellular phone 1 according to an embodiment of the present invention, and illustrates a state where casings are closed. FIG. 2 is a perspective view illustrating a state where the casings of the cellular phone 1 in FIG. 1 are expanded. This cellular phone 1 is a so-called flip phone, which is adapted such that a display casing 2 and an operation casing 5 both formed in a rectangular shape are connected to each other via a hinge part 3, and can be folded with casing surfaces of the display casing 2 and the operation casing 5 facing to each other.

The display casing 2 is arranged with a main display part 2a and a receiver 8 on an inner surface thereof facing to the operation casing 5 in the folded state. The main display part 2a is formed in a rectangular shape, and arranged such that a longer direction thereof corresponds to that of the display casing 2. The receiver 8 is arranged at an end part on a side opposite to the hinge part 3 in the display casing 2.

The operation casing 5 is arranged with multiple operation keys 4 and a transmitting microphone 7 on an inner surface thereof facing to the display casing 2 in the folded state. The transmitting microphone 7 is arranged at an end part on a side opposite to the hinge part 3 in the operation casing 5.

Such flip phone 1 can be carried with being compactly folded, and if the casings are expanded, operations for pressing down the operation keys 4 can be performed while viewing a display on the main display part 2a. Also, the cellular phone 1 is adapted to enable a telephone conversation in an excellent condition with a mouth being brought close to the transmitting microphone 7 and an ear being brought close to the receiver 8 by bringing the main display part 2a into the vertically long state as illustrated in FIG. 2, and placing the ear against the inner surface of the display casing 2.

That is, to transmit/receive higher quality voice, it is preferable to bring the mouth close to the transmitting microphone 7 and bring the ear close to the receiver 8, and to do so, a distance between the transmitting microphone 7 and the receiver 8 should be kept to some extent. The cellular phone 1 of the present embodiment is adapted such that the transmitting microphone 7 is arranged at the end part on the side opposite to the hinge part 3 in the operation casing 5, and the receiver 8 is arranged at the end part on the side opposite to the hinge part 3 in the display screen 2, whereby the distance between the transmitting microphone 7 and the receiver 8 in the vertically long state can be kept.

The hinge part 3 has a configuration in which a connecting part 3a connected to the operation casing 5 so as to be rotationally movable, and a holding part 3b for holding the display casing 2 with facing to an outer surface of the display casing 2 are integrally formed. The connecting part 3a includes two cylindrical bodies formed at one end part of the holding part 3b so as to project at a certain interval between each other. At one end part in a longer direction on an inner surface of the operation casing 5, a cylindrical body 6 is formed so as to extend in a shorter direction, and by coaxially arranging the cylindrical body 6 between the two connecting parts 3a and rotatably fitting them to each other, the hinge part 3 is connected to the operation casing 5 so as to be rotationally movable.

The holding part 3b is formed in a rectangular plate shape, and when the main display part 2a is brought into the vertically long state, faces to about half of an outer surface of the display casing 2 on a hinge part 3 side. The holding part 3b is adapted to rotatably hold the display casing 2 in a plane parallel to the main display part 2a, and the display casing 2 is adapted to be able to rotate with an inclination angle to the operation casing 5 being kept. On an outer surface of the holding part 3b on a side opposite to the display casing 2, a sub display part 11 for providing a display mainly with the casings being closed is arranged.

FIG. 3 is a perspective view illustrating a state where the display casing 2 of the cellular phone 1 in FIG. 2 is rotated, and illustrates a state where the display casing 2 is rotated clockwise from the state illustrated in FIG. 2 by approximately 45 degrees as viewed from the front. FIG. 4 is a perspective view illustrating a state where the display casing 2 of the cellular phone 1 in FIG. 2 is rotated, and illustrates a state where the display casing 2 is rotated clockwise from the state illustrated in FIG. 2 by 90 degrees as viewed from the front. A user can rotate the display casing 2 within an angle range of 90 degrees in the plane parallel to the main display part 2a with grasping the operation casing 5 to thereby rotate the display casing 2 between the vertically long state illustrated in FIG. 2 and the horizontally long state illustrated in FIG. 4.

The cellular phone 1 is adapted to enable a TV broadcast to be watched, and by rotating the display casing 2 from the state illustrated in FIG. 2, and bringing the main display part 2a into the horizontally state through the state illustrated in FIG. 3, TV images can be displayed in an excellent condition on the main display part 2a in the horizontally long state in accordance with an aspect ratio of the TV images. The main display part 2a is formed in the rectangular shape of which a ratio of a long side to a short side is 16:9, which coincides with the aspect ratio of TV images used for a typical TV broadcast.

In a case where the display casing 2 is rotated clockwise from the state illustrated in FIG. 2, a biasing force is adapted to act on the display casing 2 anticlockwise by biasing means provided inside the holding part 3b of the hinge part 3 until the state illustrated in FIG. 3 is reached. Accordingly, in the state illustrated in FIG. 2, the display casing 2 is adapted to be kept in the state illustrated in FIG. 2 by the biasing force acting on the display casing 2 anticlockwise unless an external force acts.

On the other hand, if the display casing 2 is further rotated clockwise from the state illustrated in FIG. 3, the biasing force acting on the display casing 2 is switched to a clockwise force, and then the display casing 2 is locked in a state illustrated in FIG. 4. Based on this, the display casing 2 is adapted to be kept in the state illustrated in FIG. 4 unless an external force acts.

In the present embodiment, the display casing 2 does not rotate around a rotary shaft fixed at a certain position, but is adapted to rotate around a rotary shaft moving with the rotation of the display casing 2. Based on this, even if the display casing 2 in the vertically long state in which one end part in the longer direction is close to the operation casing 5 as illustrated in FIG. 2 is rotated by 90 degrees, it is adapted such that one end part in the shorter direction of the display casing 2 is brought close to the operation casing 5 as illustrated in FIG. 4, and a TV screen can be displayed on the main display part 2a having been compactly brought into the horizontally long state to watch the TV broadcast.

Also, by rotating the display casing 2 from the vertically long state to the horizontally long state while grasping the operation casing 5, the TV broadcast can be watched without shifting the cellular phone 1 from one hand to the other. At this time, the display casing 2 is adapted to be able to be smoothly switched between the vertically long state and the horizontally long state by the biasing force acting on the display casing 2.

FIGS. 5 to 7 are rear views of the cellular phone 1 in the states illustrated in FIGS. 2 to 4, respectively, and each illustrates a structure inside the holding part 3b as viewed transparently. Also, FIGS. 8 to 10 are front views of the hinge part 3 in the states illustrated in FIG. 2 to 4, respectively. FIGS. 5 and 8 correspond to the vertically long state illustrated in FIG. 2; FIGS. 6 and 9 to the state illustrated in FIG. 3 in which the display casing 2 is rotated by approximately 45 degrees; and FIGS. 7 and 10 to the horizontally long state illustrated in FIG. 4.

Inside the holding part 3b, a rectangular-shaped holding plate 16 is arranged, by which the display casing 2 is rotatably held. The holding plate 16 is formed with a circular arc hole 12 circularly extending in the horizontal direction, and a linear hole 14 linearly extending in the vertical direction. A top of the middle of the circular arc hole 12 is adjacent to one end part of the linear hole 14, and the linear hole 14 extends in a normal direction at the top.

The circular arc hole 12 and the linear hole 14 are respectively rotatably engaged with a slide shaft 13 and a rotary shaft 15 formed on a rear surface side of the display casing 2. The slide shaft 13 and the rotary shaft 15 are integrally formed on a shaft holding member 18 fixed to a rear surface of the display casing 2, and respectively arranged at positions displaced from a center of the display casing 2 at a certain interval between each other. The shaft holding member 18 engages with the holding plate 16 inside the holding part 3b via an opening 3d formed in a front surface of the holding part 3b.

The shaft holding member 18 is fixed to the holding plate 16 via a torsion coil spring 20, which is one example of a spring as the biasing means. The torsion coil spring 20 is connected to the slide shaft 13 on the shaft holding member 18 at one end part thereof, and to a fitting shaft 19 formed on the holding plate 16 at the other end part thereof. The fitting shaft 19 is rotatably arranged on a normal line at a top of the circular arc hole 12. The display casing 2 is fitted with an end part of a flexible board 21 extending from the hinge part 3 side, adjacently to the rotary shaft 15, and via the flexible board 21, the display casing 2 and the operation casing 5 are electrically connected to each other.

In the vertically long state illustrated in FIGS. 5 and 8, the rotary shaft 15 abuts with a lower end of the linear hole 14, and the slide shaft 13 abuts with one end of the circular arc hole 12. In this state, the slide shaft 13 is biased toward the one end side of the circular arc hole 12 by the torsion coil spring 20, and therefore the display casing 2 is adapted to be kept in this state unless an external force acts.

If the display casing 2 is rotated with respect to the hinge part 3 from this state, the rotary shaft 15 moves up along the linear hole 14, and the slide shaft 13 moves to the other end side along the circular arc hole 12. At this time, the torsion coil spring 20 also rotates around the fitting shaft 19, and is contracted such that one and the other end parts thereof are brought close to each other. Then, in the state where the display casing 2 is rotated by approximately 45 degrees as illustrated in FIGS. 6 and 9, the rotary shaft 15 abuts with an upper end of the linear hole 14, and the slide shaft 13 reaches the top of the circular arc hole 12.

In this state, the one and the other end parts of the torsion coil spring 20 are in the closest state, and if the display casing 2 is further rotated, horizontal positions of the slide shaft 13 and the fitting shaft 19 are reversed, and the one and the other end parts of the torsion coil spring 20 are again separated. That is, if the display casing 2 is rotated from the rotational position illustrated in FIGS. 6 and 9, it is further rotated by the biasing force of the torsion coil spring 20, and consequently, brought into the horizontally long state as illustrated in FIGS. 7 and 10.

While the display casing 2 is in the horizontally long state, the rotary shaft 15 abuts with the lower end of the linear hole 14, and the slide shaft 13 abuts with the other end of the circular arc hole 12. In this state, the slide shaft 13 is biased toward the other end side of the circular arc hole 12 by the torsion coil spring 20, and therefore the display casing 2 is adapted to be kept in this state unless an external force acts.

FIG. 11 is a block diagram illustrating an example of an electrical configuration of the cellular phone 1. The cellular phone 1 includes a speaker 9, an external input/output terminal 10, a communication part 23, a TV broadcast receiving part 24, and a rotational position sensing part 25, in addition to the above-described main display part 2a, sub display part 11, receiver 8, transmitting microphone 7, and operation keys 4, and operations of them are adapted to be controlled by a control part 30 including a processor.

The speaker 9 is intended to enable voice to be heard with an ear being apart from the display casing 2 by amplifying the voice to output it louder than the case where it is outputted from the receiver 8. Also, if an external input/output device 26 such as an earphone-microphone is connected to the external input/output terminal 10, the voice can be inputted/outputted via the external input/output device 26. The receiver 8, the speaker 9, and the external input/output terminal 10 constitute voice output means respectively.

Note that the receiver 8 is used with a user placing his/her ear against the inner surface of the display casing 2, whereas the speaker 9 and the external input/output terminal 10 are used with the user setting his/her ear apart from the inner surface of the display casing 2. Accordingly, the display of TV images and the like on the main display part 2a can be viewed while the speaker 9 or the external input/output terminal 10 is used, but cannot be viewed while the receiver 8 is used.

When the speaker 9 is used to make telephone conversation with the opposite side telephone set, voice from the opposite side telephone set is amplified and then outputted from the speaker 9, and an input signal from the transmitting microphone 7 is amplified, whereby a so-called hands-free conversation can be made without grasping the cellular phone 1. At this time, the input signal from the transmitting microphone 7 is adapted to be inputted to a cancel circuit for preventing howling. Switching between the normal telephone conversation using the receiver 8 and the hands-free conversation can be performed by operating the operation keys 4.

It is adapted such that a connecting terminal of the external input/output device 26 can be attached/detached to/from the external input/output terminal 10, and on the basis of the attachment/detachment of the connecting terminal, the switching between the normal telephone conversation using the receiver 8 and the telephone conversation using the external input/output device 26 can be performed. That is, by attaching the connecting terminal of the external input/output device 26 to the external input/output terminal 10, the switching from the normal telephone conversation to the telephone conversation using the external input/output device 26 can be performed, whereas by detaching the connecting terminal of the external input/output device 26 from the external input/output terminal 10, the telephone conversation can be restored to the normal telephone conversation using the receiver 8.

The communication part 23 transmits/receives a radio wave to/from a base station via an antenna 23a for communication to thereby transmit/receive call voice. In the state where the telephone conversation state with the opposite side telephone set is established, a voice signal based on call voice of the user is transmitted from the communication part 23, and a voice signal based on call voice from the opposite side telephone set is received by the communication part 23, whereby the two types of call voice are transmitted and received in real time, respectively.

The TV broadcast receiving part 24 is a so-called TV tuner, and intended to receive, via an antenna 24a for TV broadcast reception, TV broadcast waves transmitted from a TV station. The TV broadcast waves transmitted from the TV station include an analog broadcast wave corresponding to an analog broadcast and a digital broadcast wave corresponding to a digital broadcast. The digital broadcast wave received by the TV broadcast receiving part 24 is a one-segment broadcast wave for cellular phones, which is allocated to a certain band for a general digital high-vision broadcast wave, and includes, in addition to TV images and TV voice, character information such as captions corresponding to the TV images and associated articles.

On the basis of the TV broadcast wave received by the TV broadcast receiving part 24, the TV images are displayed on the main display part 2a, and various types of TV voice corresponding to the TV images are outputted from the speaker 9 or the external input/output terminal 10, whereby the TV broadcast can be watched. Also, by extracting the character information included in the TV broadcast wave to display it on the main display part 2a, the character information such as the captions can be displayed together with the TV images.

The rotational position sensing part 25 includes a mechanical or electrical switch, and senses a rotational position of the display casing 2. The rotational position sensing part 25 is rotating operation detecting means adapted to detect a rotating operation of the display casing 2 by the user.

FIG. 12 is a block diagram for explaining operations for a case where the communication part 23 and the TV broadcast receiving part 24 receive signals. In the present embodiment, the control part 30 performs program processing to thereby function as an incoming call processing part 31, a response part 32, a drive voltage supplying part 33, and a TV output part 34.

If a call signal from the opposite side telephone set is received by the communication part 23, incoming call processing for enabling a response based on an off-hook operation by the user is performed in the incoming call processing part 31. During the incoming call processing, a ring tone for informing that a call from the opposite side telephone set is incoming is normally outputted from the speaker 9. The incoming call processing is continued until the call from the opposite side telephone set is cancelled, or the user starts performing the off-hook operation. We here assume that the off-hook operation includes any operations by the user to respond to the call from the opposite side telephone set.

If, during the incoming call processing, the user performs the off-hook operation to thereby respond to the call from the opposite side telephone set, the response part 32 transmits the response signal from the communication part 23 to the opposite side telephone set to thereby establish the telephone conversation state, which enables call voice to be transmitted/received to/from the opposite side telephone set. In the telephone conversation state being established, voice from the opposite side telephone set is outputted from any of the receiver 8, the speaker 9, or the external input/output device 26 connected to the external input/output terminal 10.

While the TV broadcast receiving part 24 receives a TV broadcast wave, signals representing TV images, TV audio, character information, and the like based on the TV broadcast wave are inputted to the TV output part 34. Also, the TV output part 34 is adapted to be inputted with a signal from the response part 32. The TV output part 34 includes a drive voltage control part 35, a TV image displaying part 36, and a TV audio output part 37.

The drive voltage control part 35 transmits a signal for controlling the supply of the drive voltage to the drive voltage supplying part 33 for supplying the drive voltage to the TV broadcast receiving part 24. That is, the drive voltage control part 35 is adapted to constitute drive voltage supply starting means when starting the supply of the drive voltage by the drive voltage supplying part 33, or drive voltage supply stopping means when stopping the supply of the drive voltage by the drive voltage supplying part 33.

The drive voltage supplying part 33 is intended to supply the drive voltage from a power source (not shown) provided in the cellular phone 1 to the TV broadcast receiving part 24. Note that the above power source may include a battery removably fitted into the cellular phone 1, for example, a secondary battery.

The TV image displaying part 36 is intended to display the TV images and character information based on the TV broadcast wave on the main display part 2a, and includes an image rotating part 38 for rotating the images to be displayed on the main display part 2a, and a character information displaying part 39 for extracting the character information included in the TV broadcast wave to display it on the main display part 2a. The TV audio output part 37 outputs the TV audio based on the TV broadcast wave to the speaker 9, or the external input/output device 26 connected to the external input/output terminal 10.

FIG. 13 is a flowchart illustrating an example of horizontally long state switching processing performed when the state of the display casing 2 is switched from the vertically long state to the horizontally long state. If the display casing 2 is rotated, and then the rotational position sensing part 25 senses that the state of the display casing 2 has been switched from the vertically long state to the horizontally long state (Yes in Step S101), and further if the drive voltage is supplied to the TV broadcast receiving part 24 by the drive voltage supplying part 33 (Yes in Step S102), a display of the TV images based on the TV broadcast wave received by the TV broadcast receiving part 24 is rotated by 90 degrees by the image rotating part 38 (Step S103). Based on this, the TV images are displayed with the shorter direction of the main display part 2a in the horizontally long state being made vertical, and a direction of the TV images can be aligned with the rotational position.

On the other hand, if, after the state of the display casing 2 has been switched from the vertically long state to the horizontally long state, the drive voltage is not supplied to the TV broadcast receiving part 24 by the drive voltage supplying part 33 (No in Step S102), the drive voltage control part 35 starts the supply of the drive voltage by the drive voltage supplying part 33 (Step S104). This causes the TV broadcast receiving part 24 to be driven, and the TV images and TV audio based on the TV broadcast wave received by the TV broadcast receiving part 24 to be outputted from the TV output part 34.

As described, only by rotating the display casing 2 from the vertically long state to the horizontally long state, the supply of the drive voltage to the TV broadcast receiving part 24 can be started to automatically display the TV images on the main display part 2a. Accordingly, to watch the TV broadcast, it is not necessary to perform both of the operations for rotating the display casing 2 and starting the supply of the drive voltage to the TV broadcast receiving part 24, and therefore the burden of operations can be reduced.

FIG. 14 is a flowchart illustrating an example of vertically long state switching processing performed when the state of the display casing 2 is switched from the horizontally long state to the vertically long state. If, after the display casing 2 has been rotated, the rotational position sensing part 25 senses that the state of the display casing 2 has been switched from the horizontally long state to the vertically long state (Yes in Step S201), and further if the drive voltage is supplied to the TV broadcast receiving part 24 by the drive voltage supplying part 33 (Yes in Step S202), and the incoming call processing part 31 performs the incoming call processing (Yes in Step S203), the response part 32 establishes the telephone conversation state in response to the incoming call (Step S204). At this time, the operation for switching the state of the display casing 2 from the horizontally long state to the vertically long state acts as the off-hook operation by the user.

Then, on the basis of the input signal from the response part 32, the drive voltage control part 35 stops the supply of the drive voltage by the drive voltage supplying part 33 (Step S205). This causes the drive of the TV broadcast receiving part 24 to be stopped, and the TV images and TV audio based on the TV broadcast wave received by the TV broadcast receiving part 24 to be stopped.

As described, only by rotating the display casing 2 from the horizontally long state to the vertically long state while the incoming call processing is performed with the display casing 2 being in the horizontally long state and the TV images being displayed on the main display part 2a, the incoming call can be responded to, and the supply of the drive voltage to the TV broadcast receiving part 24 can be stopped. Accordingly, if a call from the opposite side telephone set is made while the TV broadcast is watched, the call can be responded to only by rotating the display casing 2, so that it is not necessary to perform both of the operations for rotating the display casing 2 and responding to the call, and therefore the burden of operations can be reduced.

Also, if the display casing 2 is rotated from the horizontally long state to the vertically long state to respond to the call, the user has to place his/her ear against the inner surface of the display casing 2 to make telephone conversation, and therefore cannot view the main display part 2a, so that by automatically stopping the supply of the drive voltage to the TV broadcast receiving part 24, and an output of the TV images and TV audio, power consumption can be efficiently reduced.

On the other hand, if, after the state of the display casing 2 has been switched from the horizontally long state to the vertically long state, the drive voltage is supplied to the TV broadcast receiving part 24 by the drive voltage supplying part 33, and further if the incoming call processing part 31 does not perform the incoming call processing (No in Step S203), the display of the TV images based on the TV broadcast wave is rotated by 90 degrees by the image rotating part 38 (Step S206). Based on this, the TV images are displayed with the longer direction of the main display part 2a in the vertically long state being made vertical, and a direction of the TV images can be aligned with the rotational position.

At this time, the aspect ratio of the TV images based on the TV broadcast wave is 16:9, which is horizontally long, whereas the main display part 2a is in the vertically long state, and therefore if the TV images are displayed on the main display part 2a so as to match a horizontal width of the TV images to that of the main display part 2a, a blank space appears on a display screen of the main display part 2a. In the blank space, the character information such as captions corresponding to the TV images is displayed by the character information displaying part 39 (Step S207). Accordingly, if the display of the character information is desired, the character information can be displayed only by rotating the display casing 2 to the vertically long state, and therefore convenience can be further improved.

In the present embodiment, the configuration in which the display casing 2 does not rotate around a rotary shaft fixed at a certain position, but rotates around the rotary shaft vertically moving with the rotation of the display casing 2 has been described; however, the present invention is not limited to such configuration, but can be applied to a cellular phone of which the display casing 2 rotates around a fixed rotary shaft if the display casing 2 is configured to be rotatable in a plane parallel to the main display part 2a between the vertically long state and the horizontally long state.

Also, the present invention is not limited to the configuration in which the drive voltage control part 35 stops the supply of the drive voltage by the drive voltage supplying part 33 only if the display casing 2 is rotated from the horizontally long state to the vertically long state while the incoming call processing is performed by the incoming call processing part 31, but may have a configuration in which the drive voltage control part 35 also stops the supply of the drive voltage by the drive voltage supplying part 33 if the display casing 2 is rotated from the horizontally long state to the vertically long state while the incoming call processing is not performed by the incoming call processing part 31. In this case, it may be adapted such that a call can be responded to by performing the off-hook operation based on an operation other than the operation for rotating the display casing 2, such as an operation of the operation keys 4 by the user.

DESCRIPTION OF REFERENCE NUMERALS

1 Cellular phone
2 Display casing
2a Main display part
3 Hinge part
4 Operation keys
5 Operation casing
7 Transmitting microphone
8 Receiver
9 Speaker
10 External input/output terminal
23 Communication part
23a The antenna for communication
24 TV broadcast receiving part
24a The antenna for TV broadcast reception
25 Rotational position sensing part
26 External input/output device
30 Control part
31 Incoming call processing part
32 Response part
33 Drive voltage supplying part
34 TV output part
35 Drive voltage control part 36 TV image displaying part
37 TV audio output part
38 Image rotating part
39 Character information displaying part

The invention claimed is:

1. A cellular phone comprising:
 a display casing formed with a rectangular display screen on a casing surface;
 voice outputting means arranged inside said display casing on one end side in a longer direction of said display screen, the voice outputting means being used with a user placing his/her ear against said casing surface;
 holding means adapted to rotatably hold said display casing in a plane parallel to said display screen such that said display screen is brought into a vertically long state or a horizontally long state;
 rotating operation detecting means adapted to detect a rotating operation of said display casing by the user;
 television broadcast receiving means adapted to receive a television broadcast wave;
 drive voltage supplying means adapted to supply a drive voltage to said television broadcast receiving means;
 television image displaying means adapted to display a television image on said display screen, the television image being generated on a basis of the received television broadcast wave and rotated according to said rotating operation; and
 drive voltage supply stopping means adapted to stop a supply of the drive voltage by said drive voltage supplying means on a basis of the rotating operation for making said display screen displaying the television image undergo a transition from the horizontally long state to the vertically long state;
 wireless communication means adapted to transmit/receive a call signal and a response signal; and
 incoming call responding means adapted to, on a basis of the rotating operation for making said display screen displaying the television image undergo the transition from the horizontally long state to the vertically long state, generate said response signal to establish a telephone conversion state during a time period during which said call signal can be responded to, wherein
 said drive voltage supply stopping means stops, on the basis of the rotating operation for making said display screen displaying the television image undergo the transition from the horizontally long state to the vertically long state, the supply of the drive voltage by said drive voltage supplying means during the time period during which said call signal can be responded to, and
 said television image displaying means has first image rotating means adapted to, on the basis of the rotating operation for making said display screen displaying the television image undergo the transition from the horizontally long state to the vertically long state, rotate the display of the television image with respect to said display screen during a time period other than the time period during which said call signal can be responded to.

2. The cellular phone according to claim 1, wherein
 said television image displaying means has character information displaying means adapted to extract character information corresponding to the television image from the television broadcast wave to display the character information together with the television image on said display screen having been brought into the vertically long state.

3. The cellular phone according claim 1, comprising drive voltage supply starting means adapted to, on a basis of the rotating operation for making said display screen undergo a transition from the vertically long state to the horizontally long state, start the supply of the drive voltage by said drive voltage supplying means while the drive voltage is not supplied to said television broadcast receiving means.

4. The cellular phone according to claim 3, wherein
 said television image displaying means has second image rotating means adapted to, on the basis of the rotating operation for making said display screen displaying the television image undergo the transition from the vertically long state to the horizontally long state, rotate the display of the television image by 90 degrees with respect to said display screen while the drive voltage is supplied to said television broadcast receiving means.

5. The cellular phone according to claim 2, comprising drive voltage supply starting means adapted to, on a basis of the rotating operation for making said display screen undergo a transition from the vertically long state to the horizontally long state, start the supply of the drive voltage by said drive voltage supplying means while the drive voltage is not supplied to said television broadcast receiving means.

* * * * *